(12) United States Patent
Nam et al.

(10) Patent No.: US 11,076,406 B2
(45) Date of Patent: Jul. 27, 2021

(54) BEAM MANAGEMENT FOR PHYSICAL DOWNLINK CONTROL CHANNEL (PDCCH) TRANSMISSION AND RECEPTION

(71) Applicant: QUALCOMM Incorporated, San Diego, CA (US)

(72) Inventors: Wooseok Nam, San Diego, CA (US); Tao Luo, San Diego, CA (US); Xiao Feng Wang, San Diego, CA (US); Sumeeth Nagaraja, San Diego, CA (US); Sony Akkarakaran, Poway, CA (US); Makesh Pravin John Wilson, San Diego, CA (US); Kaushik Chakraborty, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/027,875

(22) Filed: Jul. 5, 2018

(65) Prior Publication Data

US 2019/0014570 A1    Jan. 10, 2019

Related U.S. Application Data

(60) Provisional application No. 62/529,280, filed on Jul. 6, 2017.

(51) Int. Cl.
*H04W 72/04* (2009.01)
*H04B 7/06* (2006.01)
(Continued)

(52) U.S. Cl.
CPC ........ *H04W 72/046* (2013.01); *H04B 7/0617* (2013.01); *H04B 7/0695* (2013.01);
(Continued)

(58) Field of Classification Search
CPC . H04W 72/046; H04W 72/042; H04W 88/08; H04W 88/02; H04B 7/0695; H04B 7/088; H04B 7/0617
See application file for complete search history.

(56) References Cited

U.S. PATENT DOCUMENTS 9,680,537 B2      6/2017 Inoue et al.
2018/0041261 A1   2/2018 Modarres Razavi et al.
(Continued)

OTHER PUBLICATIONS

Sun S., et al., "Multi-beam Antenna Combining for 28 GHz Cellular Link Improvement in Urban Environments," 2013 IEEE Global Communications Conference, 6 pages.
(Continued)

*Primary Examiner* — Thai Nguyen
(74) *Attorney, Agent, or Firm* — Patterson + Sheridan, L.L.P.

(57) ABSTRACT

Aspects of the present disclosure relate to receiver beamforming management procedures. According to certain aspects, beams from the set of beams configured at the user equipment (UE) may be not recovered, deleted, removed, and/or merged. A method by a UE includes communicating with a base station using a set of beams. The UE receives signaling, from the base station, indicating one or more beams of the set to be removed from the set and updates the beams in the set based on the signaling.

27 Claims, 11 Drawing Sheets

(51) Int. Cl.
*H04B 7/08* (2006.01)
*H04W 88/08* (2009.01)
*H04W 88/02* (2009.01)

(52) U.S. Cl.
CPC .......... *H04B 7/088* (2013.01); *H04W 72/042* (2013.01); *H04W 88/02* (2013.01); *H04W 88/08* (2013.01)

(56) References Cited

U.S. PATENT DOCUMENTS

| | | | |
|---|---|---|---|
| 2018/0062770 A1 | 3/2018 | Reial et al. | |
| 2018/0219604 A1* | 8/2018 | Lu | H04B 7/0695 |
| 2019/0349915 A1* | 11/2019 | Ahn | H04B 7/0695 |
| 2020/0067685 A1* | 2/2020 | Awad | H04W 72/042 |

OTHER PUBLICATIONS

Xue Q., et al., "Beamspace SU-MIMO for Future Millimeter Wave Wireless Communications," IEEE Journal on Selected Areas in Communications, Apr. 14, 2017, pp. 1-12.

Huawei et al., "RAN2 Aspects of DL Beam Management", 3GPP Draft; R2-1706718 RAN2 Aspects of DL Beam management, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017 Jun. 26, 2017, XP051301218, Retrieved from the Internet: URL:http://www.3gpp.org/ftp/Meetings_3GPP_SYNC/RAN2/Docs/ [retrieved on Jun. 26, 2017], 4 pages.

International Search Report and Written Opinion—PCT/US2018/041076—ISA/EPO—Sep. 21, 2018.

QUALCOMM: "Beam Management for NR", 3GPP Draft; R1-1711160, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051300360, Retrieved from the Internet: URL:http://www.3gpp.org/ftp/Meetings_3GPP_SYNC/RAN1/Docs/ [retrieved on Jun. 26, 2017], 13 pages.

Samsung: "Beam Management for PDCCH", 3GPP Draft; R1-1711604 Beammanagement PDCCH V2.1, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017 Jun. 26, 2017, XP051300777, Retrieved from the Internet: URL:http://www.3gpp.org/ftp/Meetings_3GPP_SYNC/RAN1/Docs/ [retrieved on Jun. 26, 2017], 6 pages.

* cited by examiner

BEAM MANAGEMENT FOR PHYSICAL DOWNLINK CONTROL CHANNEL (PDCCH) TRANSMISSION AND RECEPTION

CROSS-REFERENCE TO RELATED APPLICATION & PRIORITY CLAIM

This application claims benefit of and priority to U.S. Provisional Patent Application Ser. No. 62/529,280, filed Jul. 6, 2017, herein incorporated by reference in its entirety as if fully set forth below and for all applicable purposes.

INTRODUCTION

Field of the Disclosure

Aspects of the present disclosure relate to wireless communications, and more particularly, beam management for physical downlink control channel (PDCCH) transmission and reception.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

As described herein, certain wireless systems may employ directional beams for transmission and reception. Aspects described herein provide techniques to remove some of the configured to reduce the number of beams involved in the beam management procedures, thereby increasing efficiency and saving power.

Certain aspects of the present disclosure provide a method for wireless communication that may be performed, for example, by a UE. The method generally includes communicating with a base station using a set of beams. The method includes receiving signaling, from the base station, indicating one or more beams of the set to be removed from the set and updating the beams in the set based on the signaling.

Certain aspects of the present disclosure provide a method for wireless communication that may be performed, for example, by a network entity (e.g., a base station such as a next generation Node B (gNB)). The method generally includes communicating with a UE using a set of beams and providing signaling, to the UE, indicating one or more beams of the set to be removed from the set.

Certain aspects of the present disclosure provide an apparatus for wireless communication such as, for example, a UE. The apparatus generally includes means for communicating with a base station using a set of beams. The apparatus includes means for receiving signaling, from the base station, indicating one or more beams of the set to be removed from the set and means for updating the beams in the set based on the signaling.

Certain aspects of the present disclosure provide an apparatus for wireless communication such as, for example, by a network entity. The apparatus generally includes means for communicating with a UE using a set of beams and means for providing signaling, to the UE, indicating one or more beams of the set to be removed from the set.

Certain aspects of the present disclosure provide an apparatus for wireless communication such as, for example, a UE. The apparatus generally includes a transceiver configured to communicate with a base station using a set of beams. The apparatus includes a receiver configured to receive signaling, from the base station, indicating one or more beams of the set to be removed from the set and at least one processor coupled with a memory and configured to update the beams in the set based on the signaling.

Certain aspects of the present disclosure provide an apparatus for wireless communication such as, for example, by a network entity. The apparatus generally includes a transceiver configured to communicate with a UE using a set of beams and at least one processor coupled with a memory and configured to provide signaling, to the UE, indicating one or more beams of the set to be removed from the set.

Certain aspects of the present disclosure provide a computer readable medium having computer executable code stored thereon for wireless communication. The computer executable code generally includes code for communicating with a base station using a set of beams. The computer executable code includes code for receiving signaling, from the base station, indicating one or more beams of the set to be removed from the set and code for updating the beams in the set based on the signaling.

Certain aspects of the present disclosure provide an apparatus for wireless communication such as, for example, by a network entity. The apparatus generally includes means for communicating with a UE using a set of beams and means for providing signaling, to the UE, indicating one or more beams of the set to be removed from the set.

Aspects generally include methods, apparatus, systems, computer readable mediums, and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
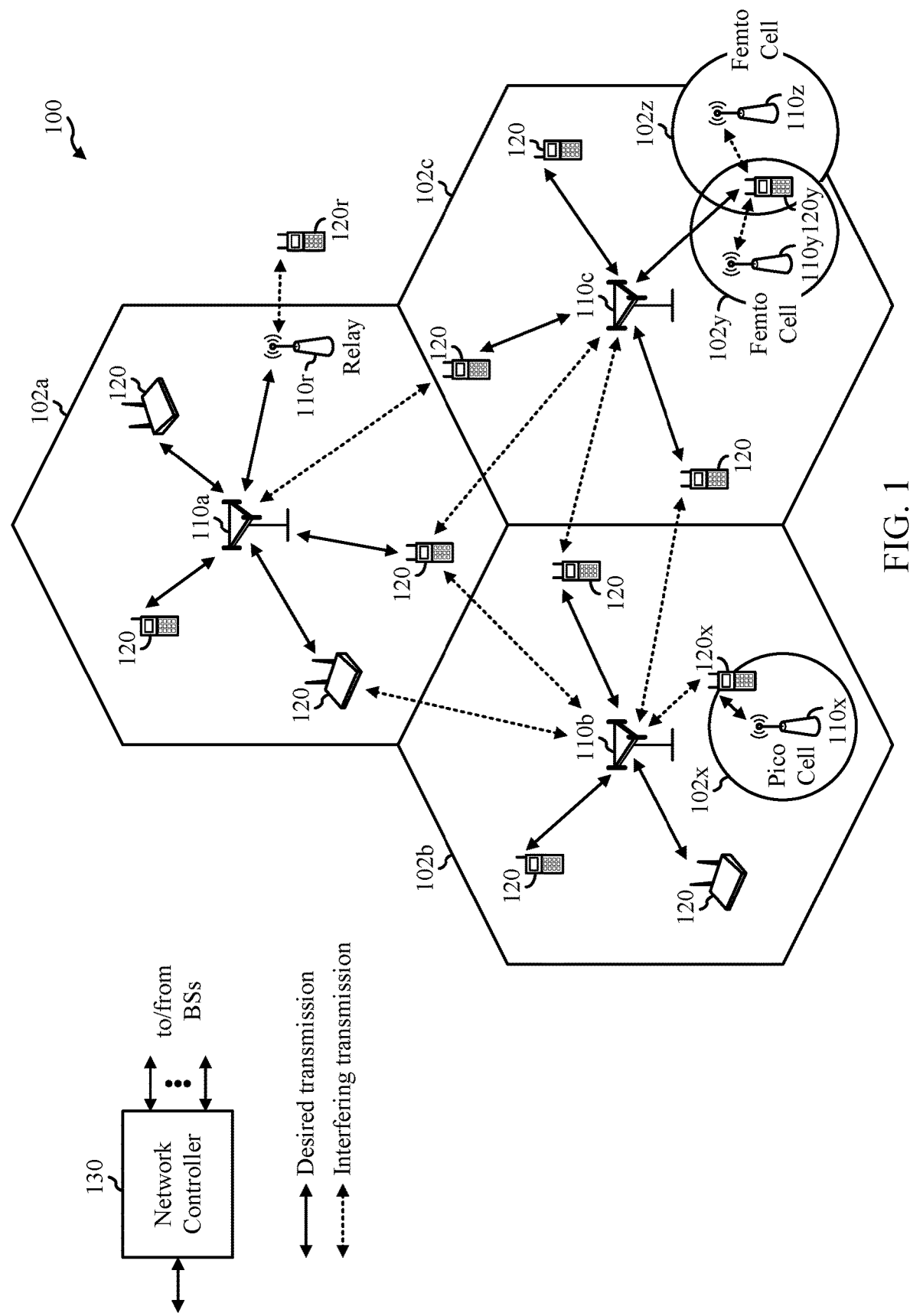
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology). NR may support various wireless communication services, such as Enhanced mobile broadband (eMBB) targeting wide bandwidth (e.g. 80 MHz and beyond), millimeter wave (mmW) targeting high carrier frequency (e.g. 25 GHz and beyond), massive MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by these systems necessitate new techniques such as hybrid beamforming (i.e., analog and digital), which are not present in 3G and 4G systems. Hybrid beamforming may enhance link budget/signal-to-noise ratio (SNR) that may be exploited during the random access channel (RACH) procedures.

In such systems, the base station (BS) (e.g., a next generation Node B (gNB)) and the user equipment (UE) may communicate using beam-formed transmissions. In order for beamforming to function correctly, the NB may monitor beams using beam measurements performed (e.g., based on reference signals transmitted by the BS) and feedback generated at the UE. However, since the direction of a reference signal is unknown to the UE, the UE may evaluate several beams to obtain the best UE receive (Rx) beam for a given BS transmit (Tx) beam. Accordingly, if the UE has to "sweep" through all of its Rx beams to perform the measurements (e.g., to determine the best Rx beam for a given Tx beam), the UE may incur significant delay in measurement and battery life impact. Moreover, sweeping through all Rx beams is highly resource inefficient. Thus, aspects of the present disclosure provide techniques to assist a UE when performing measurements of serving and neighbor cells when using Rx beamforming. The techniques may reduce the number of beams that the UE monitors/sweeps through, thereby, increasing the UE resource efficiency.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

Figure 8:
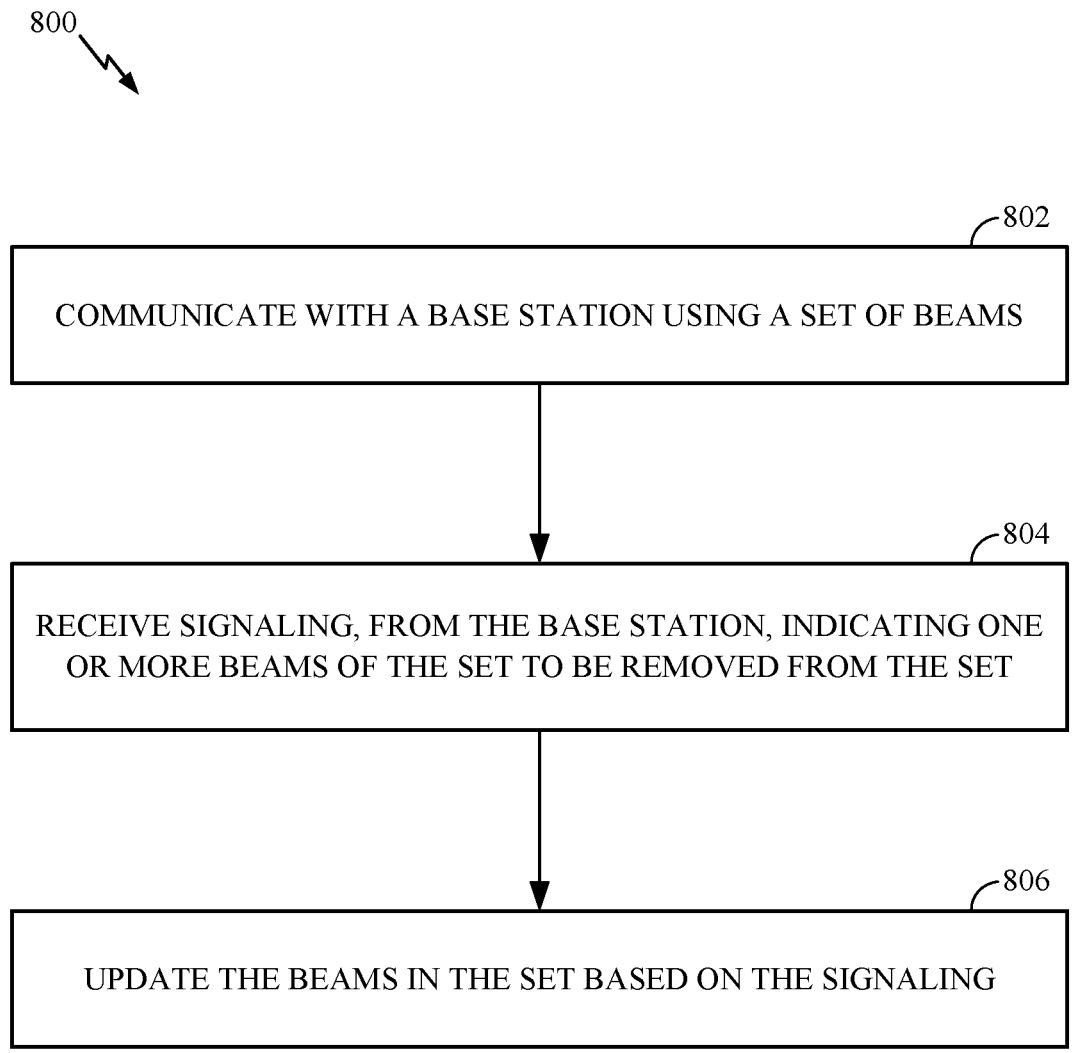
FIG. 8 illustrates example operations that may be performed by a UE, in accordance with aspects of the present disclosure.

FIG. 1 illustrates an example wireless communication network 100 in which aspects of the present disclosure may be performed. According to an example, the wireless network may be a NR or 5G network which may support mmW communication. mmW communication depends on beamforming to meet link margin. mmW communication may use directional beamforming, so transmission of signaling is directional. Accordingly, a transmitter may focus transmission energy in a certain narrow direction (e.g., beams may have a narrow angle), as illustrated in FIG. 8. A receiving entity may use receiver beamforming to receive the transmitted signaling.

In order to more efficiently use resources and conserve power when communicating using beamforming, the UEs 120 may be configured to perform the operations 800 and methods described herein for UE receiver beamforming. BS 110 may comprise a transmission reception point (TRP), Next Generation Node B (gNB), 5G NB, access point (AP), new radio (NR) BS, etc.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. in some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
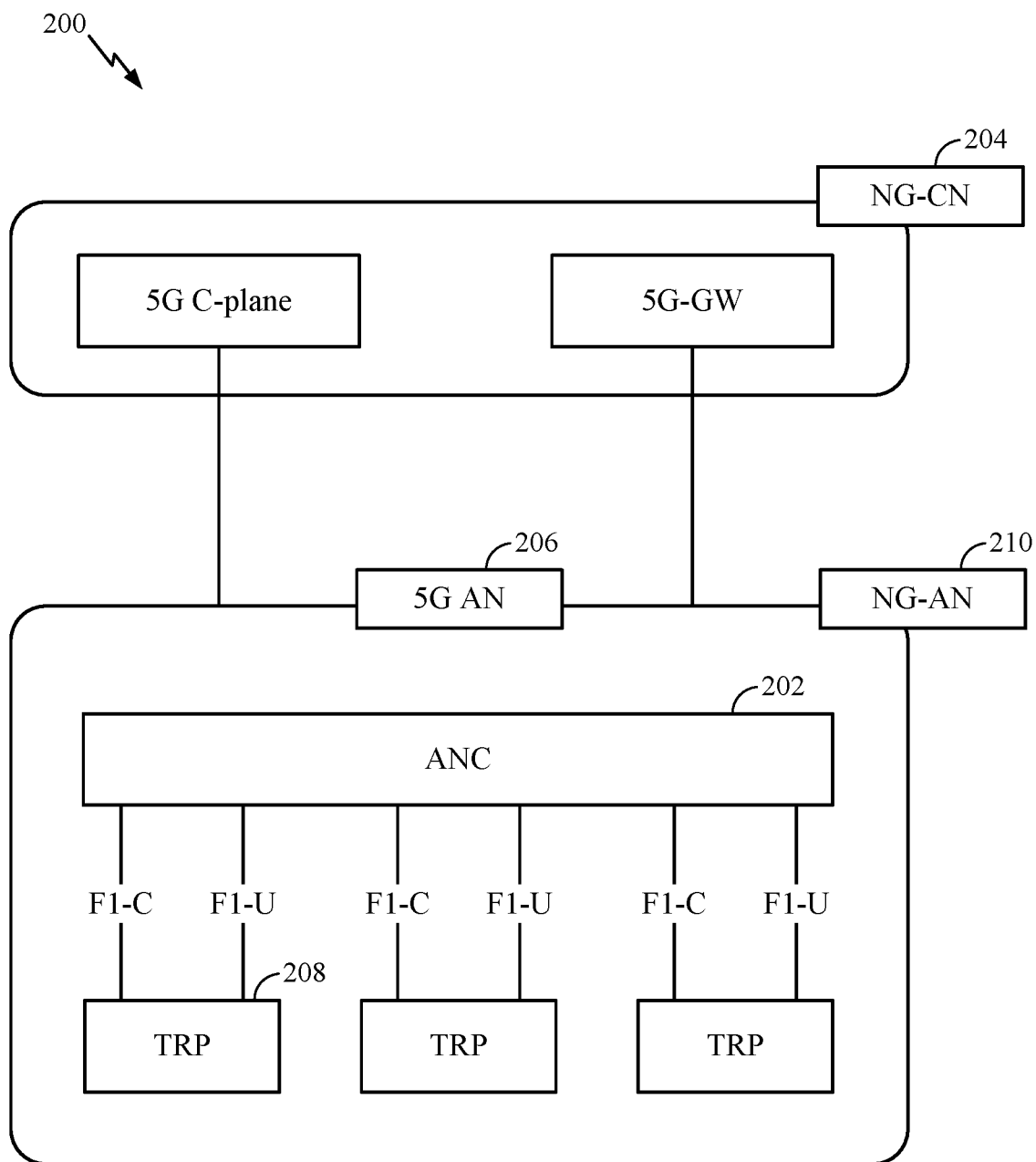
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication network 100 illustrated in FIG. 1. A 5G access node 206 may include an ANC 202. ANC 202 may be a central unit (CU) of the distributed RAN 200. The backhaul interface to the next generation core network (NG-CN) 204 may terminate at ANC 202. The backhaul interface to neighboring next generation access nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
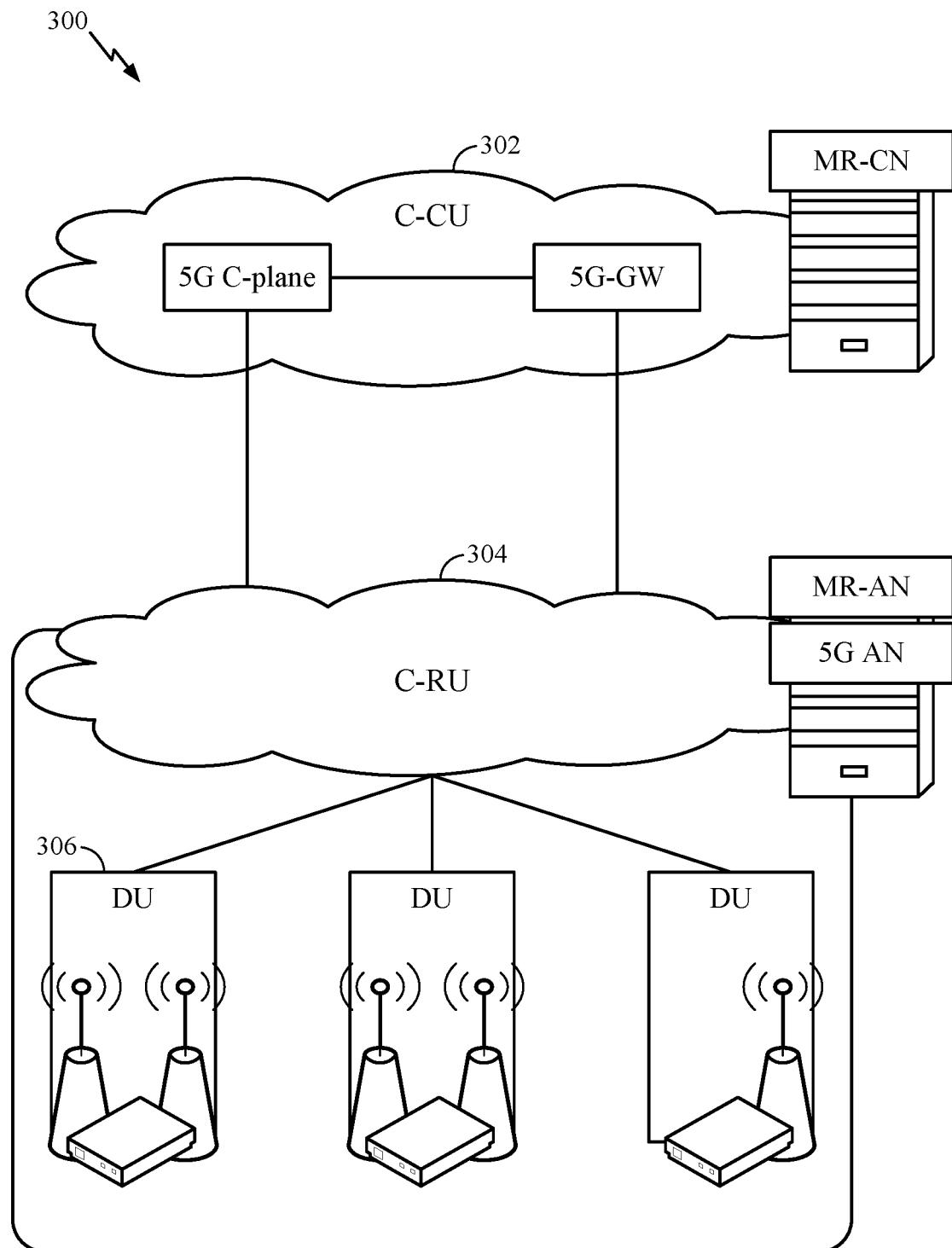
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
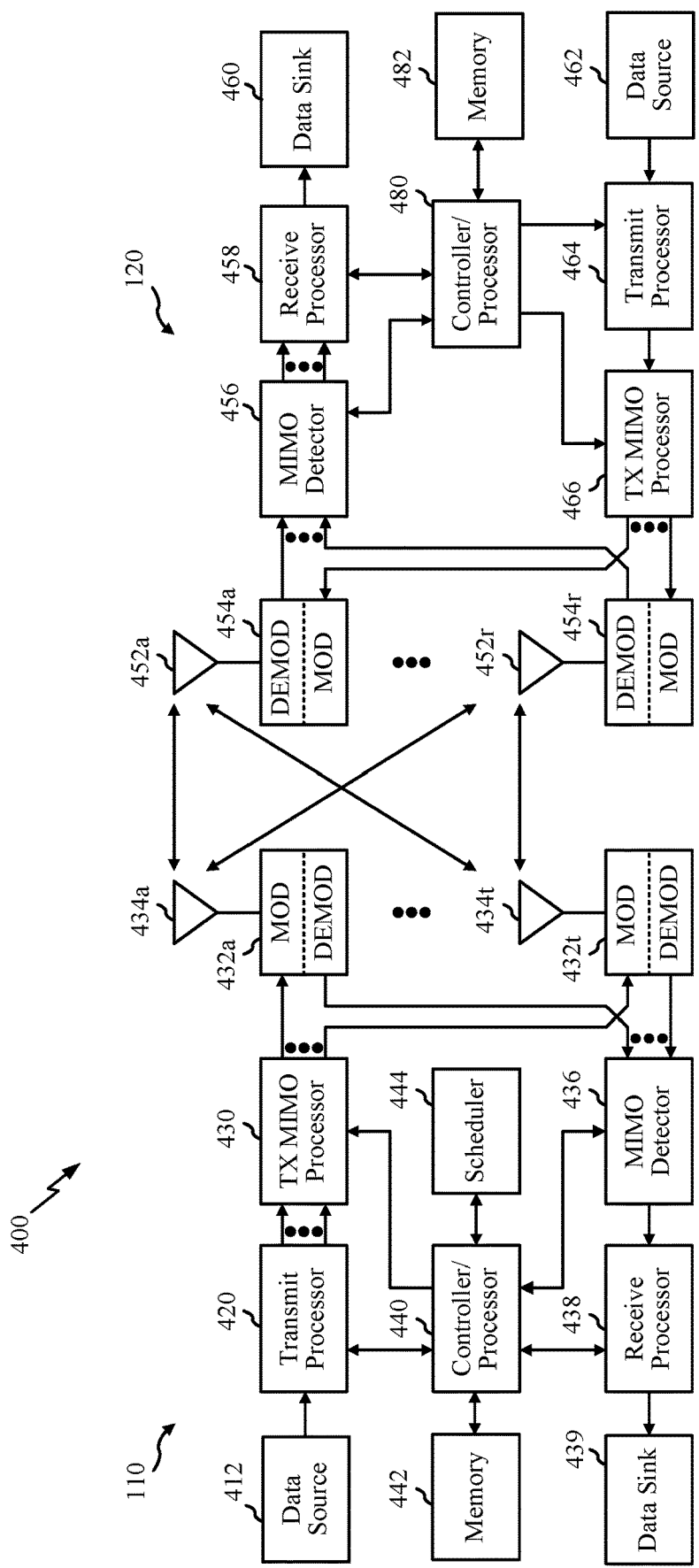
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein for beam management for PDCCH transmission and reception.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), group common PDCCH (GC PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
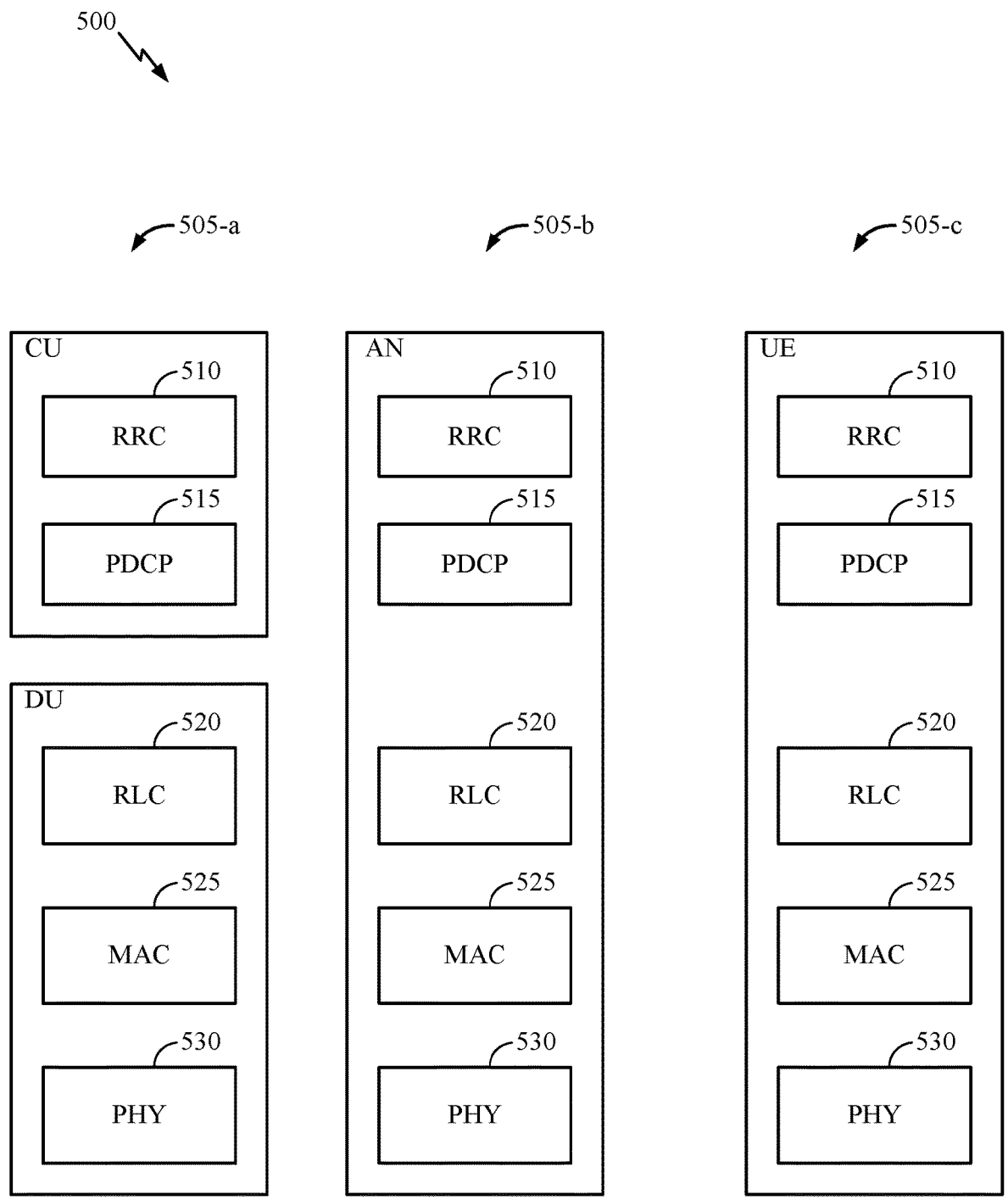
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
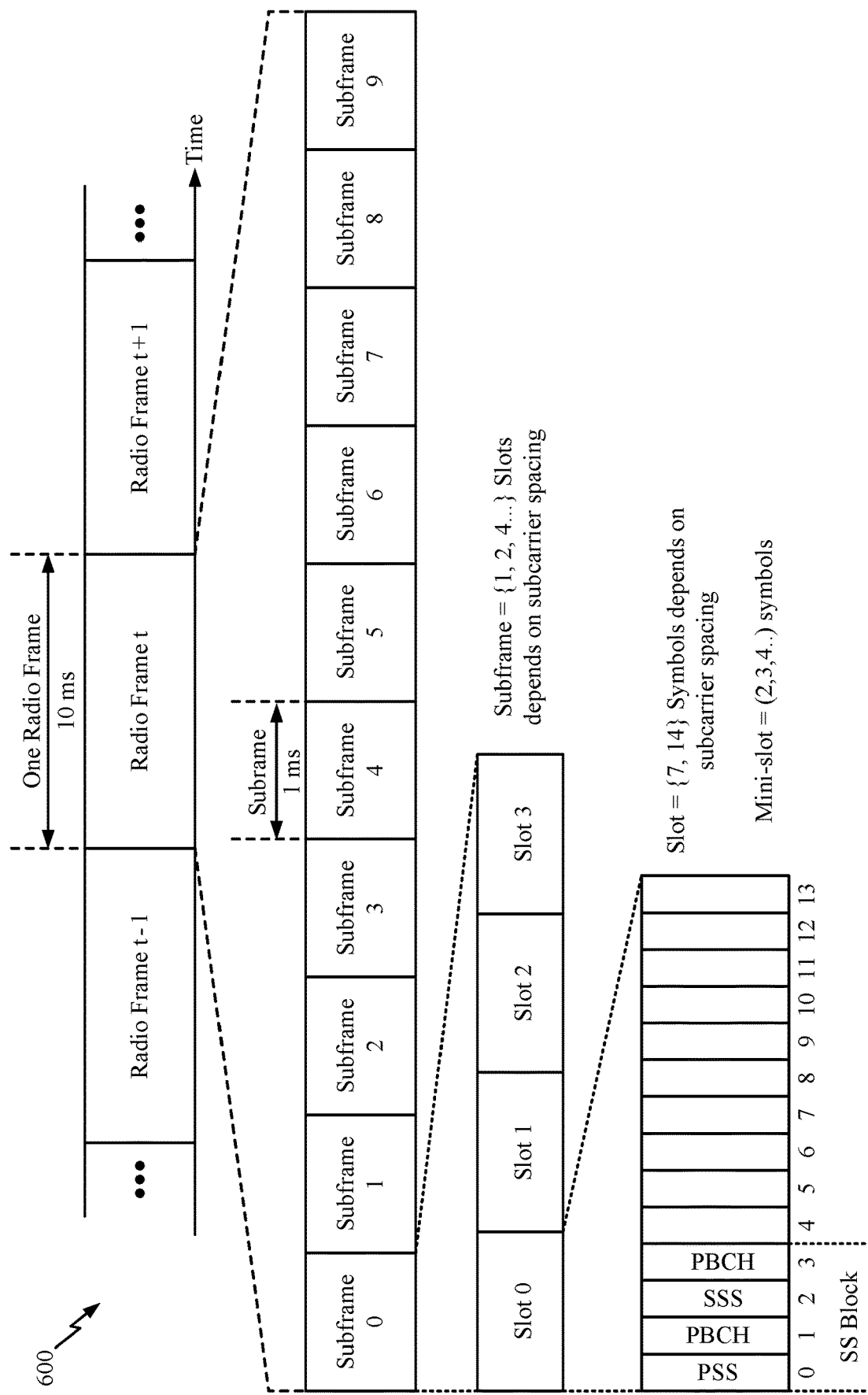
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information (SI), such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a PDSCH in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beam Refinement Procedure

As noted above, in certain multi-beam systems (e.g., millimeter wave (mmW) cellular systems), beam forming may be needed to overcome high path-losses. As described herein, beamforming may refer to establishing a link between a base station (BS) and user equipment (UE), wherein both of the devices form a beam corresponding to each other. Both the BS and the UE find at least one adequate beam to form a communication link. The BS-beam and UE-beam form what is known as a beam pair link (BPL). As an example, on the DL, a BS may use a transmit (Tx) beam and a UE may use a receive (Rx) beam corresponding to the transmit beam to receive the transmission. The combination of a transmit beam and corresponding receive beam form the BPL.

As a part of beam management, beams which are used by BS and UE are refined from time to time because of changing channel conditions, for example, due to movement of the UE or other objects. The UE typically monitors the quality of a BPL and the network may refine the BPL. Additionally, the performance of a BPL may be subject to fading due to Doppler spread. Because of changing channel conditions over time, the BPL should be periodically updated or refined. Accordingly, it may be beneficial if the BS and the UE monitor beams and new BPLs. Multiple BPLs (e.g., a set of BPLs) may be configured for communications. At least one BPL is established for network access. As described above, new BPLs may need to be discovered later for different purposes. Different BPLs may be used for different channels, for communicating with different BSs, or as fall-back BPLs in case an existing BPL fails.

Figure 7:
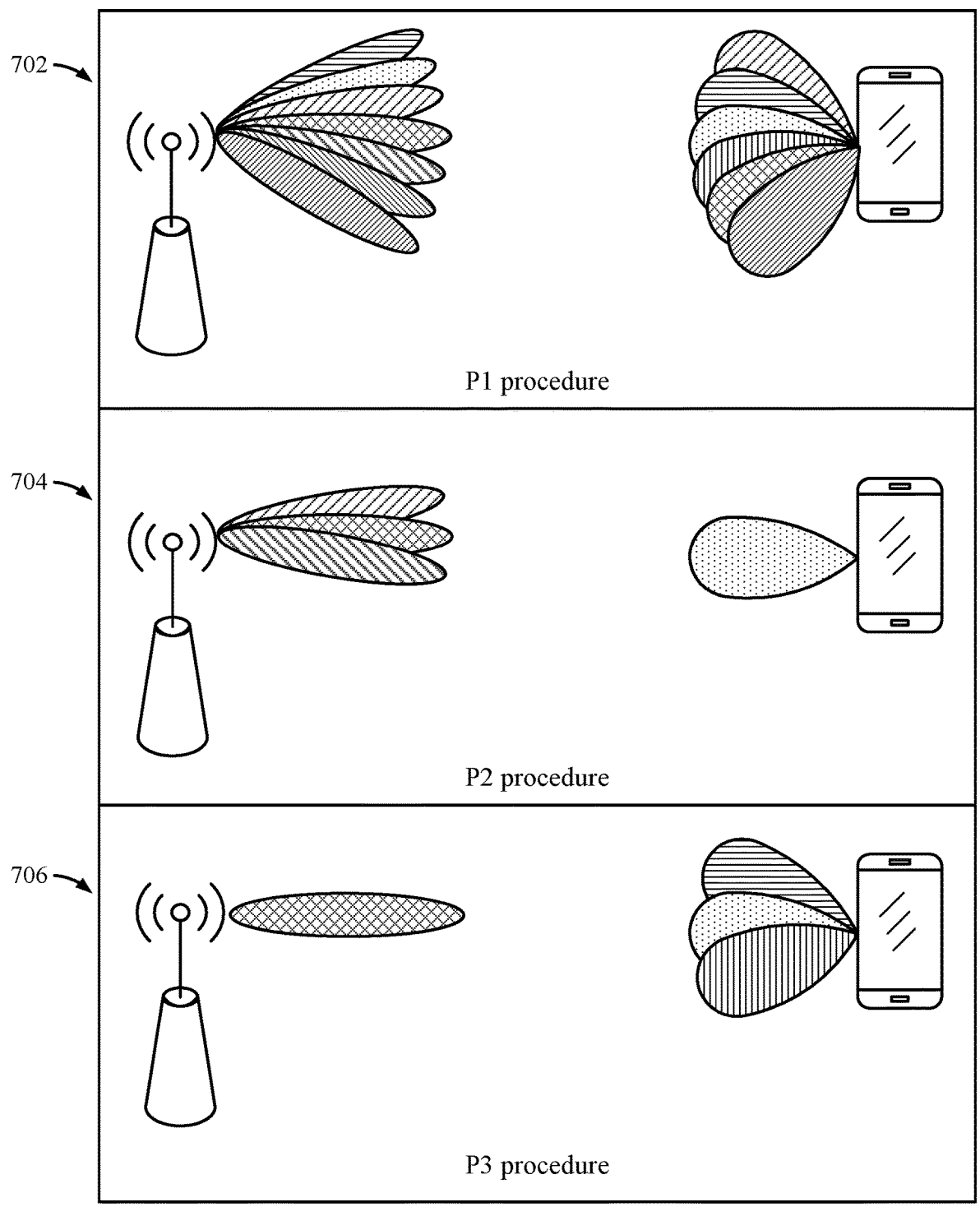
FIG. 7 illustrates an example of P1, P2, and P3 beam management procedures, in accordance with certain aspects of the present disclosure.

FIG. 7 illustrates example beam refinement procedures 702, 704, 706 for BPL discovery and refinement. In 5G-NR, the P1 procedure 702, P2 procedure 704, and P3 procedure 706 are used for BPL discovery and refinement. The network uses a P1 procedure to enable the discovery of new BPLs.

In the P1 procedure, as illustrated in FIG. 7, the BS transmits different symbols of a reference signal, each beam formed in a different spatial direction such that several (most, all) relevant places of the cell are reached. Stated otherwise, the BS transmits beams using different transmit beams over time in different directions. For successful reception of at least a symbol of this "P1-signal", the UE has to find an appropriate receive beam. The UE searches using available receive beams and applying a different UE-beam during each occurrence of the periodic P1-signal. Once the UE has succeeded in receiving a symbol of the P1-signal, the UE has discovered a BPL. The UE may not wait until it has found the best UE receive beam, since this may delay further actions. The UE may measure the reference signal receive power (RSRP) and report the symbol index together with the RSRP to the BS. Such a report will typically contain the findings of one or more BPLs. In an example, the UE may determine a received signal having a high RSRP. The UE may not know which beam the BS used to transmit the signal; however, the UE may report to the BS the time at which it observed the signal having a high RSRP. The BS may receive this report and may determine which BS beam the BS used at the given time.

The BS may then offer P2 and P3 procedures 704, 706, respectively, to refine an individual BPL. The P2 procedure 704 refines the BS-beam of a BPL. The BS may transmit a few symbols of a reference signal with different BS-beams that are spatially close to the BS-beam of the BPL (the BS performs a sweep using neighboring beams around the selected beam). In P2, the UE keeps its beam constant. Thus, while the UE uses the same beam as in the BPL (as illustrated in P2 procedure 704 in FIG. 7). The BS-beams used for P2 may be different from those for P1 in that they may be spaced closer together or they may be more focused. The UE may measure the RSRP for the various BS-beams and indicate the best one to the BS.

The P3 procedure 706 refines the UE-beam of a BPL. As shown in FIG. 7, while the BS-beam stays constant, the UE scans using different receive beams (e.g., the UE performs a sweep using neighboring beams). The UE may measure the RSRP of each beam and identify the best UE-beam. Afterwards, the UE may use the best UE-beam for the BPL and report the RSRP to the BS.

Over time, the BS and UE establish several BPLs. When the BS transmits a certain channel or signal, it lets the UE know which BPL will be involved, such that the UE may tune in the direction of the correct UE receive beam before the signal starts. In this manner, every sample of that signal or channel may be received by the UE using the correct receive beam. In an example, the BS may indicate for a scheduled signal (SRS, CSI-RS) or channel (PDSCH, PDCCH, PUSCH, PUCCH) which BPL is involved. In NR this information is called quasi-colocation (QCL) indication. Two antenna ports are QCL if properties of the channel over which a symbol on one antenna port is conveyed may be inferred from the channel over which a symbol on the other antenna port is conveyed. QCL supports, at least, beam management functionality, frequency/timing offset estimation functionality, and radio resource measurement (RRM) management functionality.

As noted above, wireless systems, such as millimeter wave (mmW) systems, bring gigabit speeds to cellular networks, due to availability of large amounts of bandwidth. However, the unique challenges of heavy path-loss faced by such wireless systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the BS (e.g., gNB) and the UE communicate over active beam-formed transmission beams, such as BPLs or a set of BPLs, that may carry data and/or control channels such as PDSCH, PDCCH, PUSCH, and PUCCH. As described above, the BS may monitor beams using beam measurements performed (e.g., based on reference signals transmitted by the BS) and feedback generated at the UE. For example, the BS may monitor active beams using UE-performed measurements of signals such as synchronization signals (e.g., NR-SS), channel state information reference signals (CSI-RS), and/or demodulation reference signals (DMRS) for common and/or UE-specific search spaces. The BS may send a measurement request to the UE and may subsequently transmit one or more reference signals for measurement at the UE.

Since the direction of a reference signal is unknown to the UE, the UE may need to evaluate several beams to obtain the best Rx beam for a given BS Tx beam. However, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming, for example, by determining/signals beams that can be removed from the set of configured beams, to reduce the number of beams the UE sweeps through.

Example Beam Management For NR PDCCH

As described above, beam management procedures (e.g., initial beam training, beam refinement, and beam recovery) for NR typically focus on searching for and adding new beams and on maintaining searched beams.

Aspects of the present disclosure, however, may help enhance such procedures by providing techniques and corresponding signaling for "deleting" and "merging" beams and/or beam pair links (BPLs), for example, by removing certain beams from a set of configured beams.

As discussed above, the UE may be configured with multiple active beams (e.g., a set of 8 active beams out of possible 64 beams in some systems). Beams management procedures and measurement may be configured for each of the active beams or a subset of the active beams (e.g., for beams associate with a control resource set (CORESET). Each of the active beams may be associated with a different beam ID (e.g. the ID of reference signal that uses the same beam); however, some of the beams in the set may correspond to the same physical beam or nearly the same beam (e.g., the same or similar angle of arrival (AoA), angle of departure (AoD), beam weights, etc.). Thus, performing separate beam management for those beams may waste resources.

Aspects of the present disclosure provide mechanisms for removing one of those beams. In other scenarios it may also be useful to remove one or more beams from the configured set of active beams, such as in the case beam failure, and/or to reduce overhead. Removing the beams may correspond to deactivating an active beam ID. In some examples, when the UE removes one beam, it may activate a different beam ID.

FIG. 8 illustrates example operations 800 for wireless communications. Operations 800 may be performed, for example, by a user equipment (e.g., a UE 120 in the wireless communication network 100) participating in beamformed communications with a base station (e.g., a BS 110 in the wireless communication system 100) that may be a gNB.

Operations 800 begin at 802 by communicating with a base station using a set of beams. At 804, the UE receives signaling, from the base station, indicating at one or more beams of the set to be removed (e.g., not-recovered, merged, or deleted) from the set. At 806, the UE updates the beams in the set based on the signaling.

Figure 9:
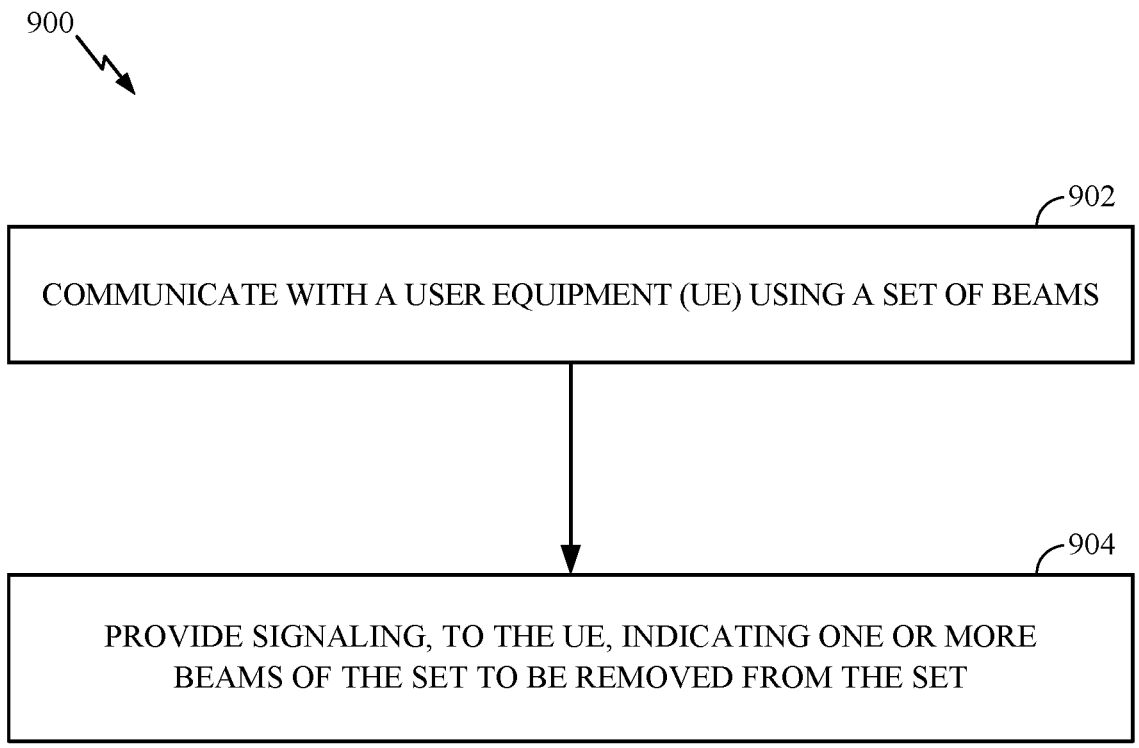
FIG. 9 illustrates example operations that may be performed by a network entity, in accordance with aspects of the present disclosure.

FIG. 9 illustrates example operations 900 for wireless communications. Operations 900 may be performed, for example, by a base station (e.g., a BS 110 in the wireless communication network 100) participating in beamformed communications with a UE performing operations 800 described above.

Operations 900 begin, at 902, by communicating with a UE using a set of beams. At 904, the BS provides signaling, to the UE, indicating one or more beams of the set to be removed from the set.

Example Recovery From Partial Beam Failure

In some cases, beams may be deleted (e.g., removed) from a set as part of a recovery from partial beam failure. As an example, assuming M out of N BPLs (M<N) have failed, a UE may use the remaining active (N−M) links to convey information regarding the failed beams to a gNB.

Based on the reported information from the UE, the gNB may initiate a beam recovery process. For example, in accordance with some conditions, the gNB may decide which links to recover or not recover. The gNB may signal the UE that a specific link is removed and will not be recovered. Such signaling may be provided, for example, through RRC, MAC-CE, and/or DCI transmissions. The UE may update its set of beam in accordance with the indication from the BS, for example, by removing the beams that the BS indicates to delete or not recover.

Example Beam/Link Merger

In some cases, beams/links may be merged. For example, from a gNB perspective, based on some metric, the gNB may determine two (or more) Tx beams are close enough to each other to be merged. If two Tx beams are close enough to be merged, the gNB may send a request to the UE to see whether the corresponding Rx beams (e.g., corresponding RX beams in BPLs with the identified TX beams) are also close enough to be merged. In response to the request, the UE may report a metric on the closeness of the two Rx beams to the gNB. Examples of closeness metrics of two beams may include angular separation between two beams or correlation between gain/phase weight-vectors of two beams. Based on the metrics on Tx/Rx beams, the gNB may decide whether to merge two BPLs or not.

From a UE-initiated perspective (or in response to a request from the BS to determine the metric), based on some metric, the UE may figure out whether Rx beams are close enough to each other to be merged. If two Rx beams are close enough, the UE may report the metric or condition to the gNB. Based on the report from the UE, the gNB may decide whether to merge to BPLs or not.

For the gNB and/or UE-initiated cases, the gNB may signal the UE to use or not to use a specific set of beams (Tx beams, Rx beams, or both). In some cases, the UE may confirm such action (e.g., through layer 1 signaling), i.e., the UE may send an indication to the gNB indicating that the set of beams at the UE has been or will be updated to remove/merge the indicated beams. Based on the indication from the gNB, the UE may update the set of configured beams, for example, by removing from the set one of the beams that are indicated to be merged. In some example, relatively narrow beams (determined to be sufficiently close to each other) may be merged into a wider beam (spanning the narrow beams). In some cases, after merging, a quasi-colocation (QCL) relationship of the beam (with other beams) may change. Such a QCL relationship may, for example, indicate whether or not two beams may be considered as experiencing same or similar channel conditions.

Example Beam/Link Deletion

In some cases, one or more beams or links may be deleted (e.g., removed from the set of configured beams). For example, in accordance with some conditions, a UE may request a gNB to delete some links. Based on the request, the gNB may decide whether to delete the links or not, and confirm the decision with the UE.

In some cases, the condition of deletion may include conditions related to UE power consumption, dropping inefficient beams/links (e.g., with poor link conditions). In some cases, the condition may relate to reducing processing overhead, signaling overhead, or some other such purpose.

In accordance with such conditions, a gNB may directly signal a UE to remove some links. In some examples, the signaling may be in the form of a request and a UE may confirm deletion from its perspective.

After merging beams and/or BPLs, a common set of QCL and BPL parameters for the merged beam and/or BPL may be selected from a larger set, for example a union of reference signals (synchronization signal, CSI-RS, etc.) in QCL relationship with the original beams and/or BPLs. As another example, the QCL relationship for the merged beam and/or BPL may be configured with a new beam, which is in the middle of the original beams and/or BPLs.

After deleting beams and/or BPLs, all the QCL relationship of the beam may be removed. In some cases, deleting may be treated as a special case of merging.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Figure 10:
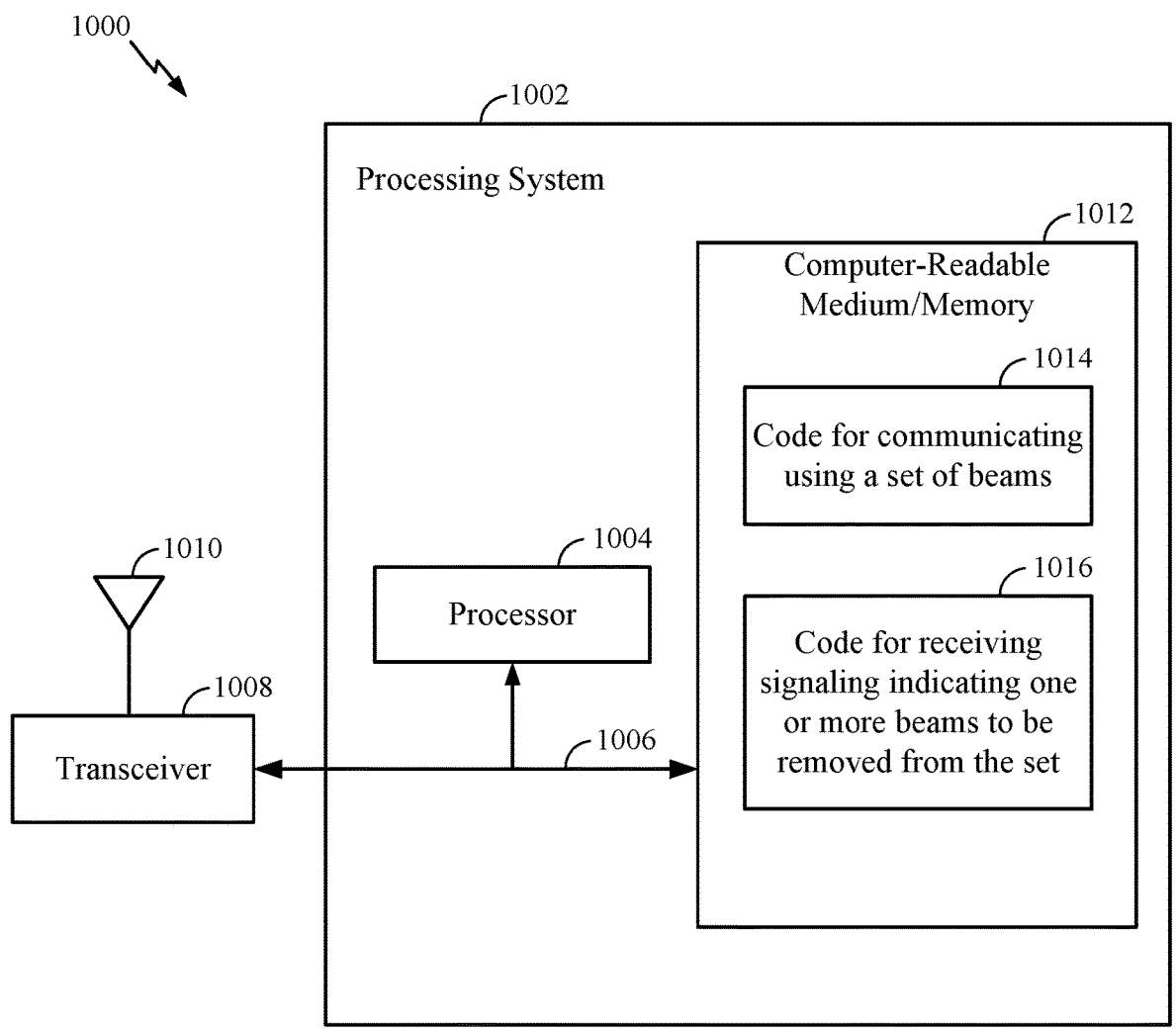
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer executable code) that when executed by the processor 1004, cause the processor 1004 to perform the operations illustrated in FIG. 8, or other operations for performing the various techniques discussed herein for beam management. In certain aspects, computer-readable medium/memory 1012 stores code 1014 for communicating using a set of beam; code 1016 for receiving signaling indicating at least one beam of the set to remove from the set; and code 1018 for updating the set of beams based on the received signaling.

Figure 11:
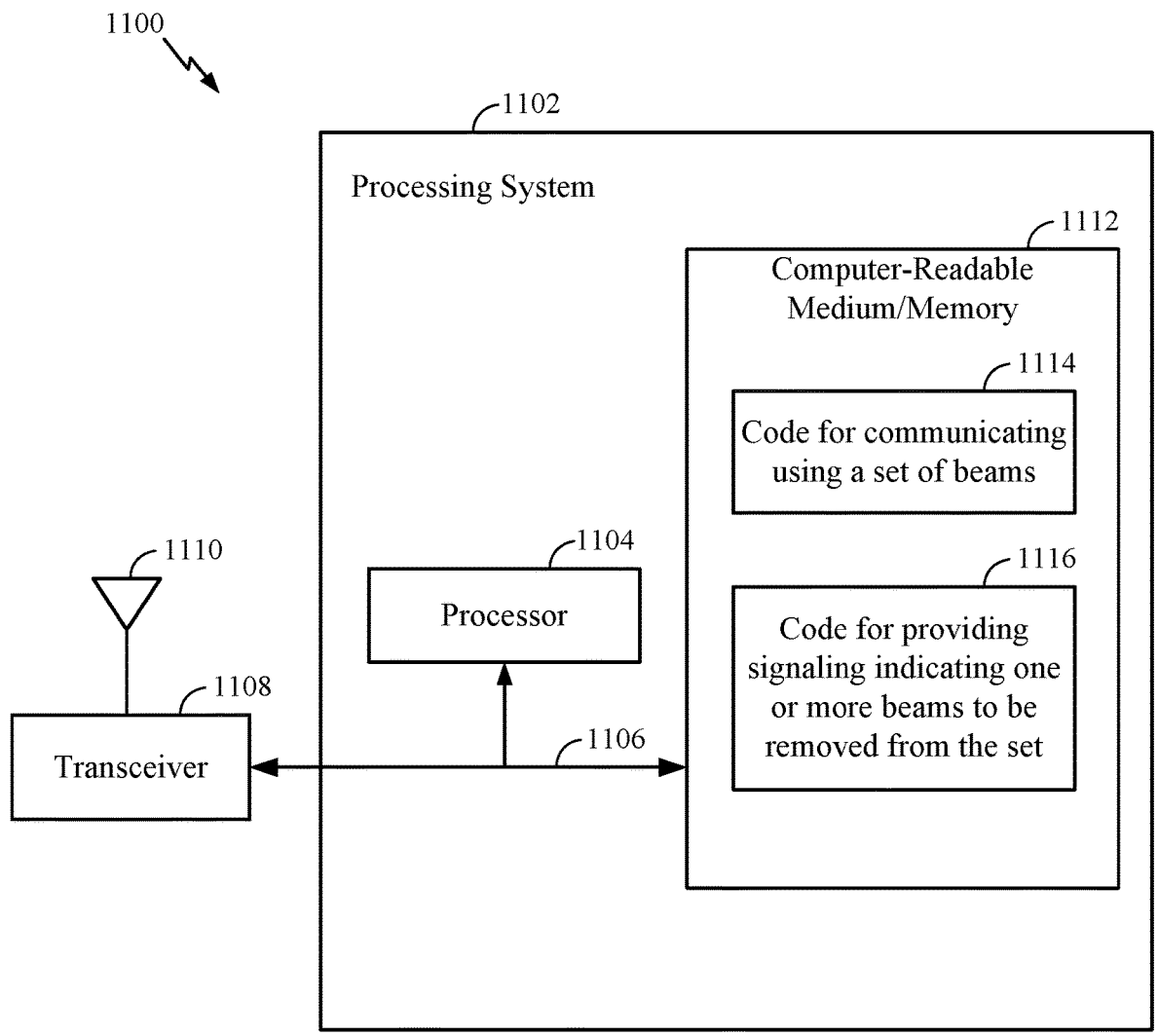
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer executable code) that when executed by the processor 1104, cause the processor 1104 to perform the operations illustrated in FIG. 9, or other operations for performing the various techniques discussed herein for beam management. In certain aspects, computer-readable medium/memory 1112 stores code 1114 for communicating using a set of beam and code 1116 for signaling an indication of at least one beam from the set to be removed from the set.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   communicating with a base station (BS) using a set of one or more beam pair links (BPLs);
   conveying to the BS, via one or more active BPLs of the set of one or more BPLs, information about one or more failed BPLs of the set of BPLs;
   receiving signaling from the BS, in response to the conveyed information, indicating that at least one BPL of the one or more failed BPLs of the set of one or more BPLs is not to be recovered and is to be removed from the set of one or more BPLs;
   performing a partial beam recovery based on the signaled indication, wherein performing the partial beam recovery comprises:

not performing beam recovery for the indicated at least one BPL of the one or more failed BPLs, and performing beam recovery for the other BPLs of the one or more failed BPLs; and updating the BPLs in the set of one or more BPLs based on the signaling.

2. The method of claim 1, wherein the signaling is received via at least one of radio resource control (RRC) signaling, a media access control (MAC) control element (CE), or downlink control information (DCI).

3. The method of claim 1, wherein the communicating comprises monitoring for physical downlink control channel (PDCCH) transmissions using the set of one or more BPLs.

4. The method of claim 1, wherein updating the BPLs in the set of one or more BPLs comprises removing the indicated at least one BPL of the one or more failed BPLs from the set of one or more BPLs.

5. The method of claim 1, further comprising:
after receiving the signaling, sending an indication to the BS indicating the set of one or more BPLs has been updated or will be updated.

6. The method of claim 1, wherein:
the method further comprises sending a request to the BS to delete one or more BPLs of the set of one or more BPLs, based on one or more conditions; and
the indicated at least one BPL of the one or more failed BPLs of the set of one or more BPLs not to be recovered and to be removed from the set of one or more BPLs is the one or more BPLs the UE requested to delete.

7. The method of claim 6, wherein the one or more conditions relate to at least one of: UE power consumption; processing overhead; or signaling overhead.

8. A method for wireless communications by a user equipment (UE), comprising:
communicating with a base station using a set of beams;
determining a metric associated with a closeness of at least two receive beams from the set of beams;
conveying, to the base station, the metric an indication of the at least two receive beams to be merged;
receiving signaling, from the base station, indicating one or more beams of the set of beams to be removed from the set of beams, in response to the conveyed metric or indication of the at least two receive beams to be merged; and
updating the beams in the set of beam based on the received signaling.

9. The method of claim 8, wherein the metric is conveyed in response to a request from the base station.

10. The method of claim 9, wherein the request from the base station indicates a request for the UE to determine the metric for at least two beam pair links (BPLs) between the UE and the base station, wherein the at least BPLs involve the at least two receive beams.

11. The method of claim 8, further comprising:
merging the at least two receive beams into a wider beam or into a beam in the middle of the at least two receive beams; and
defining at least one of one or more new quasi-colocation (QCL) parameters or one or more new beam pair link (BPL) parameters for the merged beam.

12. The method of claim 8, wherein:
the signaling, from the base station, indicating the one or more beams of the set of beams to be removed from the set of beams indicates one of the at least two receive beams to be remove from the set of beams.

13. A method for wireless communications by a network entity, comprising:
communicating with a user equipment (UE) using a set of one or more beam pair links (BPLs);
receiving, from the UE, via one or more active BPLs of the set of one or more BPLs, information about one or more failed BPLs of the set of one or more BPLs;
providing signaling to the UE, in response to the received information, indicating that at least one of the one or more failed BPLs of the set of one or more BPLs is not to be recovered and is to be removed from the set of one or more BPLs; and
performing a partial beam recovery with the UE based on the signaled indication, wherein performing the partial beam recovery comprises:
not performing beam recovery for the indicated at least one BPL of the one or more failed BPLs, and
performing beam recovery for the other BPLs of the one or more failed BPLs.

14. The method of claim 13, wherein the signaling is provided via at least one of radio resource control (RRC) signaling, a media access control (MAC) control element (CE), or downlink control information (DCI).

15. The method of claim 13, wherein the communicating comprises sending physical downlink control channel (PDCCH) transmissions using the set of one or more BPLs.

16. The method of claim 13, further comprising:
receiving an indication from the UE, indicating the set of one or more BPLs has been updated or will be updated.

17. The method of claim 13, further comprising:
receiving a request from the UE to delete one or more BPLs of the set of BPLs, wherein the indicated at least one BPL of the one or more failed BPLs of the set of one or more BPLs not to be recovered and to be removed from the set of one or more BPLs is the one or more BPLs the UE requested to delete.

18. A method of wireless communication by a network entity, comprising:
communicating with a user equipment (UE) using a set of beams;
receiving, from the UE, a metric indicating a closeness of at least two receive beams of the set of beams or an indication that the at least two receive beams of the set of beams are suggested to be merged; and
providing signaling, to the UE, indicating one or more beams of the set of beams to be removed from the set of beams, based on the received metric or the received indication from the UE.

19. The method of claim 18, further comprising:
sending a request to the UE for the metric or the indication, wherein the metric or indication is received in response to the request.

20. The method of claim 19, wherein:
the request to the UE indicates at least two beam pair links (BPLs) between the network entity and the UE for the UE to determine the metric, and
the at least two BPLs involve the at least two receive beams of the set of beams.

21. The method of claim 18, wherein:
the signaling, to the UE, indicating one or more beams of the set of beams to be removed from the set of beams, indicates one of the at least two receive beams of the set of beams, to remove from the set of beams.

22. An apparatus for wireless communications, comprising:
means for communicating with a base station (BS) using a set of one or more beam pair links (BPLs);

means for conveying to the BS, via one or more active BPLs of the set of one or more BPLs, information about one or more failed BPLs of the set of one or more BPLs;

means for receiving signaling from the BS, in response to the conveyed information, indicating that at least one BPL of the one or more failed BPLs of the set of one or more BPLs is not to be recovered and is to be removed from the set of one or more BPLs;

means for performing a partial beam recovery based on the signaled indication, wherein performing the partial beam recovery comprises:

not performing beam recovery for the indicated at least one BPL of the one or more failed BPLs, and performing beam recovery for the other BPLs of the one or more failed BPLs; and means for updating the BPLs in the set of one or more BPLs based on the signaling.

23. The apparatus of claim 22, wherein:

the apparatus further comprises means for sending a request to the BS to delete one or more BPLs of the set of one or more BPLs, based on one or more conditions; and the indicated at least one BPL of the one or more failed BPLs of the set of one or more BPLs not to be recovered and is to be removed from the set of one or more BPLs is the one or more BPLs the apparatus requested to delete.

24. An apparatus for wireless communications by a user equipment (UE), comprising:

means for communicating with a base station (BS) using a set of beams;

means for determining a metric associated with a closeness of at least two receive beams from the set of beams;

means for conveying, to the BS, the metric or, an indication of the at least two receive beams to be merged;

means for receiving signaling, from the BS, indicating one or more beams of the set of beams to be removed from the set of beams, in response to the conveyed metric or indication of the at least two receive beams to be merged;

means for updating the beams in the set of beams based on the received signaling; and means for updating the beams in the set of beams based on the received signaling.

25. An apparatus for wireless communications, comprising:

means for communicating with a user equipment (UE) using a set of one or more beam pair links (BPLs);

means for receiving, from the UE, via one or more active BPLs of the set of one or more BPLs, information about one or more failed BPLs of the set of one or more BPLs; and means for providing signaling to the UE, in response to the received information, indicating that at least one of the one or more failed BPLs of the set of one or more BPLs is not to be recovered and is to be removed from the set of one or more BPLS; and means for performing a partial beam recovery with the UE based on the signaled indication, wherein means for performing the partial beam recovery comprises:

means for not performing beam recovery for the indicated at least one BPL of the one or more failed BPLs, and means for performing beam recovery for the other BPLs of the one or more failed BPLs.

26. The apparatus of claim 25, wherein:

the apparatus further comprises means for receiving a request from the UE to delete one or more BPLs of the set of BPLs; and the indicated at least one BPL of the one or more failed BPLs of the set of one or more BPLs not to be recovered and to be removed from the set of one or more BPLs is the one or more BPLs the UE requested to delete.

27. An apparatus for wireless communications, comprising:

means for communicating with a user equipment (UE) using a set of beams;

means for receiving, from the UE, a metric indicating a closeness of at least two receive beams of the set of beams or an indication that the at least two receive beams are suggested to be merged; and means for providing signaling, to the UE, indicating one or more beams of the set of beams to be removed from the set of beams, based on the received metric or the received indication from the UE.

* * * * *